United States Patent

Benedetti

[11] Patent Number: 6,053,207
[45] Date of Patent: Apr. 25, 2000

[54] VALVE COVER AND ITS RELATED SYSTEM

[76] Inventor: George W. Benedetti, 122 Mansfield Rd., Milford, Conn. 06460

[21] Appl. No.: 09/184,258

[22] Filed: Nov. 2, 1998

[51] Int. Cl.[7] .......................................... F16L 5/00
[52] U.S. Cl. ............................ 137/820; 137/882; 137/559
[58] Field of Search ..................... 137/363, 370, 137/371, 382, 559

[56] References Cited

U.S. PATENT DOCUMENTS

| | | | |
|---|---|---|---|
| 616,542 | 12/1898 | Koehme | 137/370 |
| 1,894,381 | 1/1933 | Markle . | |
| 2,931,383 | 4/1960 | Handley | 137/370 |
| 3,267,957 | 8/1966 | Glennon . | |
| 4,874,105 | 10/1989 | Tetreault | 220/484 |
| 5,195,590 | 3/1993 | Kenner . | |
| 5,803,125 | 9/1998 | Bliss | 137/370 |

*Primary Examiner*—John Fox
*Attorney, Agent, or Firm*—David Fink

[57] ABSTRACT

The invention relates to a valve cover system in which the valve cover has a distinctive shape of a regular octagon and indicia identifying its function and relationship to the system it controls. In addition, the invention relates to a valve cover system which has a set of extensions on a valve cover socket so that the valve cover can follow ground movement and remain relatively level with the ground. Other improvements include a locking mechanism that inhibits removal of the valve cover thereby discouraging vandalism and a low friction telescopic extension to allow movement of the valve cover without damaging the conduit between the valve and the valve cover.

8 Claims, 5 Drawing Sheets

VALVE COVER AND ITS RELATED SYSTEM

FIELD OF THE INVENTION

The invention relates to valve covers and related systems such as used to cover public utilities gas valves and the like, and more particularly to an improved valve cover system having a valve cover easily located, conveniently identifiable, being adapted to resist problems resulting from variable weather conditions and shifts in the adjacent ground, and resistant to vandalism and unauthorized access.

BACKGROUND OF THE INVENTION

The advent of civilization has caused the proliferation of conveniences such as pipe lines supplying water and combustible gas such as natural gas to homes and businesses. Public utilities usually formulate the distribution of water and gas services in the form of networks with certain primary valves due to their importance in controlling the flow of gas to a high occupancy building such as a hospital, school, or shopping center, or to a district regulator valve controlling gas flow to a district regulator which is a buried mechanical device utilized for controlling pressures from a higher pressure to a lower pressure distribution system often consisting of older cast iron pipe or polyethylene pipe with restricting limits on strength to withstand pressures.

Being able to locate and to distinguish a primary valve or a district regulator valve from other valves can be critical to terminating the flow of the combustible gas and avoiding a fire being started or increased, or avoiding a dangerous explosion which can potential harm many people and create large economic loss.

In the prior art, the location of gas valves and the like has been based on coordinates using landmarks such as telephone poles. It is, however, naive to assume that telephone poles and other such landmarks would not be relocated due to changing conditions. For example, the telephone company may, for many reasons such as an automobile severely damaging a telephone pole, replace a telephone pole with another telephone pole positioned differently from the original telephone pole. This has happened and the ensuing misinformation was costly. In addition, it is possible for the valve cover to be covered inadvertently during road improvements and other projects, or for the valve cover to be hidden from view by water collecting over it due to local flooding or sinking of the valve cover over a period of time to form a concave cavity allowing the collection of water.

Another problem associated with valve covers and valves is possible corrosive damage to the valve, particularly the valve stem from brine produced from salt used to melt ice and other seepage, including chemical spills, entering the valve box.

Yet another problem is vandalism and unauthorized access, including but not limited to sabotage.

Accordingly, it can be seen that a need exists for a valve cover system to minimize and to overcome the myriad of problems of prior art valve covers and systems.

SUMMARY OF THE INVENTION

The present invention overcomes the disadvantages of the prior art problems by providing a valve cover easily identifiable and quickly distinguishable as to its critical function, and easily located along with an improved valve cover system which can be located easily, protected from vandalism, and which minimizes the adverse affect of brine and other liquid contaminants.

It is an object of the invention to provide a valve cover having a unique shape indicating the importance of the valve being covered.

It is another object of the invention to provide a valve cover with indicia on its surface indicating the importance of the valve being covered and the relationship of the valve being covered to other valves.

It is yet another object of the invention to provide a passive electronic device to enable the location of the valve cover using a transmitted electronic signal.

It is yet another object of the invention to provide a means to prevent vandalism or other unauthorized access to the valve cover system.

It is a further object of the invention to provide a valve cover system which will allow variations in the physical arrangement of the valve cover system to compensate for variation in the adjacent ground conditions, thereby inhibiting the depression of the valve cover relative the surface of the adjacent ground.

It is still a further object of the invention to provide a valve cover system which inhibits the communication of external liquids to the interior of the valve cover system, thereby inhibiting the deleterious effects of liquids such as brine on the components of the valve cover system.

Other objects and embodiments, features and advantages of the invention will become apparent upon reading the specification.

DESCRIPTION OF THE PREFERRED EMBODIMENTS

Figure 1:
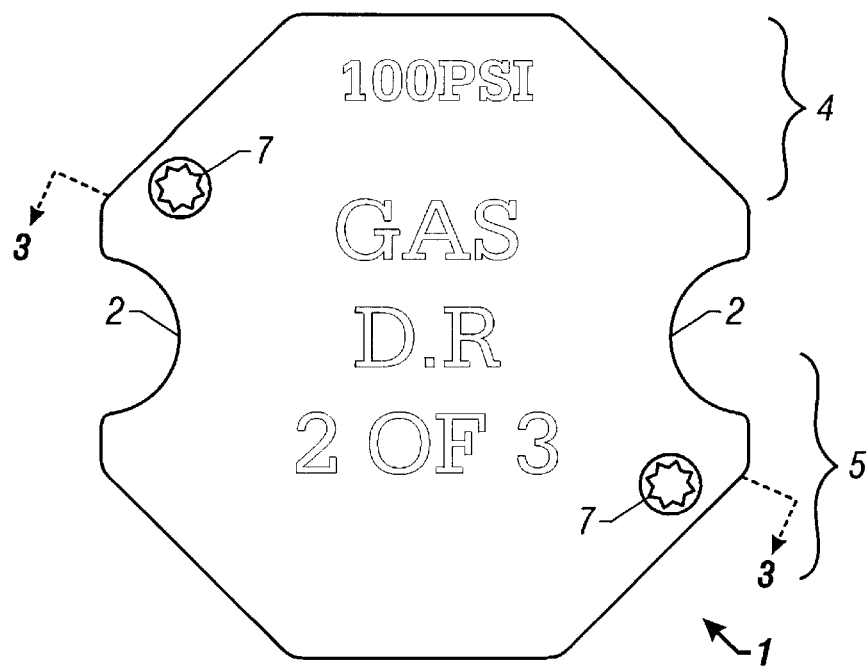
FIG. 1 is a top plan view of the valve cover according to the invention.
Figure 2:
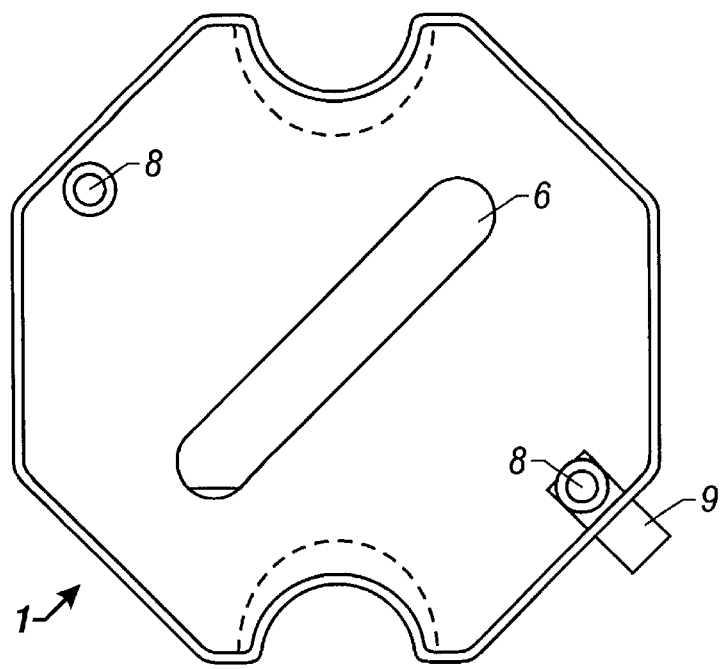
FIG. 2 is a bottom plan view of the valve cover shown in FIG. 1.
Figure 3:
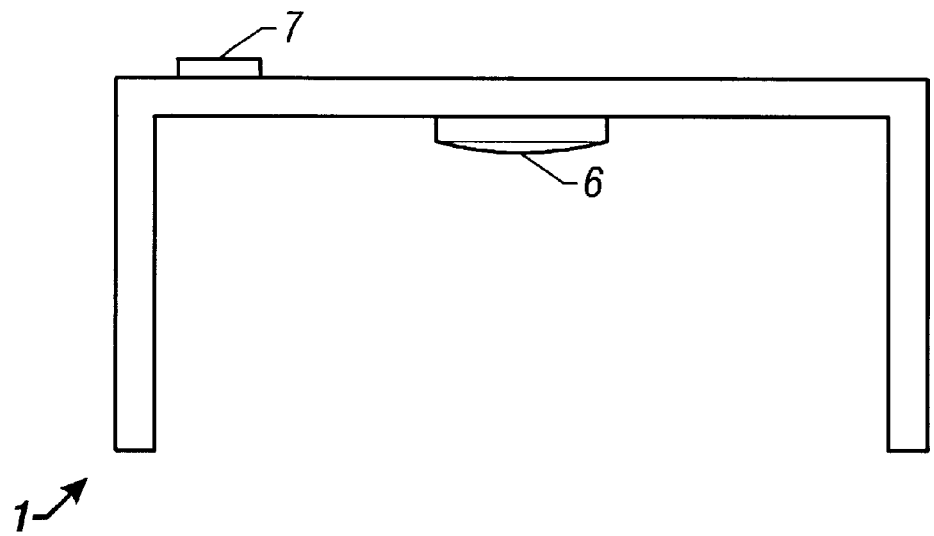
FIG. 3 is a sectional view of the valve cover shown in FIG. 1 along the lines 3—3.

FIGS. 1–3 show the valve cover 1 according to the invention. The use of a generally regular octagon shape for a valve cover, particularly for a primary valve in a gas supply system, is unique and critical in providing instant visual recognition. In critical situations, the identification of a primary valve could save lives and at least minimize economic loss. Dimples 2 are standard indentations used in the prior art facilitating the use of pry rods to raise the valve cover 1 for removal. Generally, the valve cover 1 is about 2 inches thick and the dimples 2 include undercut portions to accommodate the pry rods.

The valve cover 1 includes several visual fields containing valuable information absent from prior art valve covers. Field 4 defines the maximum allowable operating pressure and the fact that the valve controls gas. Field 5 indicates what is controlled by the valve below the valve cover 1. Here, the initials "D. R." represents "District Regulator". Thus, the regular octagon shape of the valve cover 1 along with its field 5 highlight the importance of the valve below. Field 5 also indicates the number of valves in the cluster and the number of this valve within the cluster. A cluster is the total number of valves controlling a district regulator necessary to close to stop the uncontrolled, sometimes ignited, flow of gas.

Figure 4:
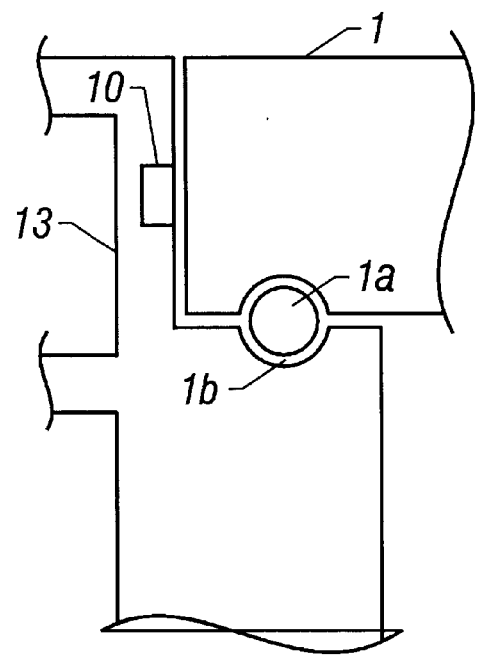
FIG. 4 is a view of a portion of the valve cover system shown in FIG. 6 on an enlarged scale showing the engagement of the valve cover into the rest of the system.

The valve cover 1 includes a locking system for engaging into a structure used with the valve cover 1. A locking system tends to inhibit vandalism and curious people. One embodiment of a locking system includes hexagonal nuts 7 that are connected to respective shafts 8 which are connected to blades 9. Rotation of the nuts 7 clockwise rotates the blades 9 which engage grooves 10 defined in a valve cover socket 13 shown in FIG. 4. Blades 9 and grooves 10 have mating tapered shear surfaces to cause the generation of a downward force during the locking process, thus compressing hermetic seal 1a to create a contaminant tight seal.

Figure 6:
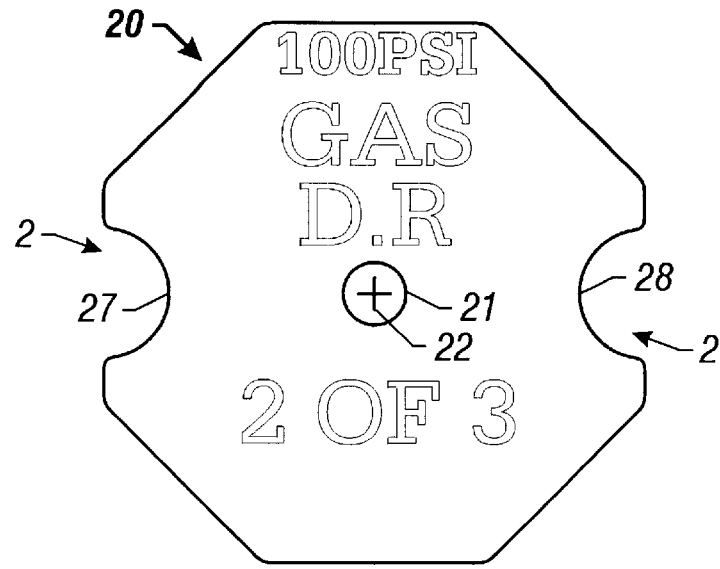
FIG. 6 is a top plan view of another embodiment of the valve cover.
Figure 7:
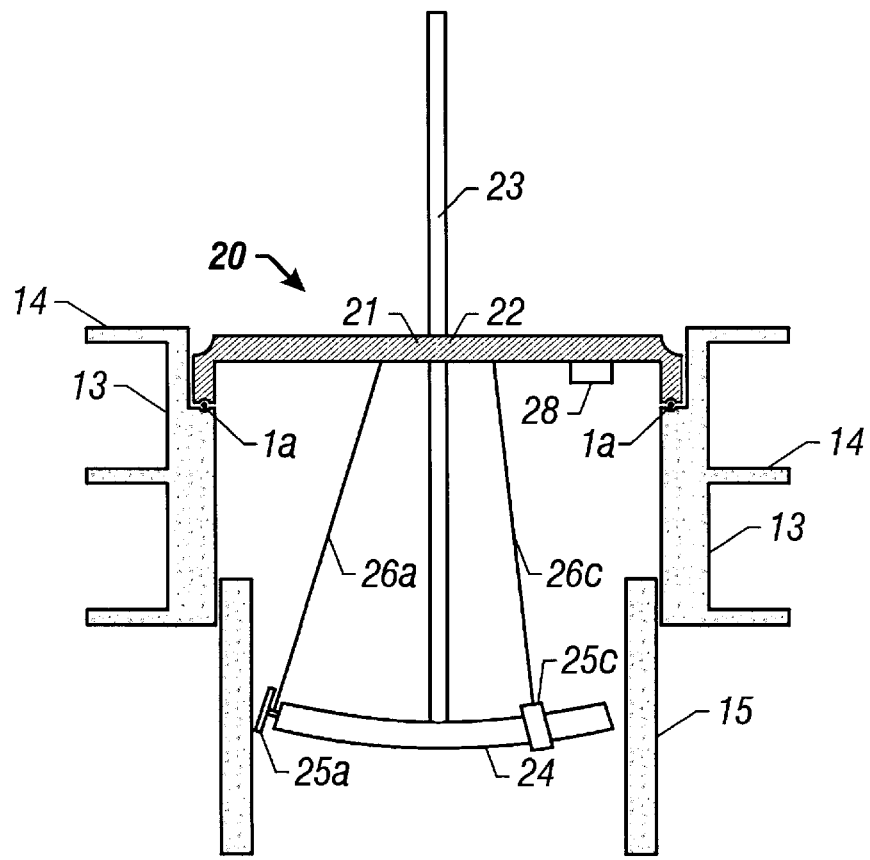
FIG. 7 is a sectional view of a portion of the valve cover system with the valve cover embodiment shown in FIG. 6 along the lines 27—27 shown in FIGS. 6 and 7, illustrating another embodiment of a valve cover locking mechanism.
Figure 8:
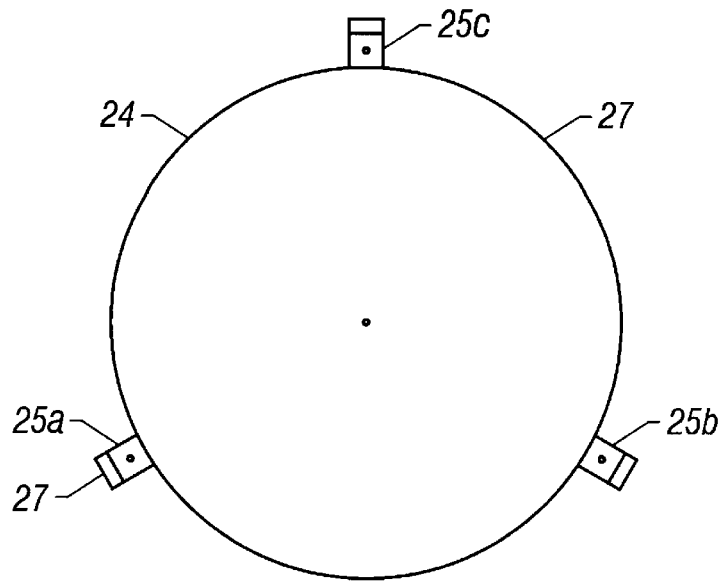
FIG. 8. is a top plan view of a portion used in the locking mechanism illustrated in FIG. 7.
Figure 9:
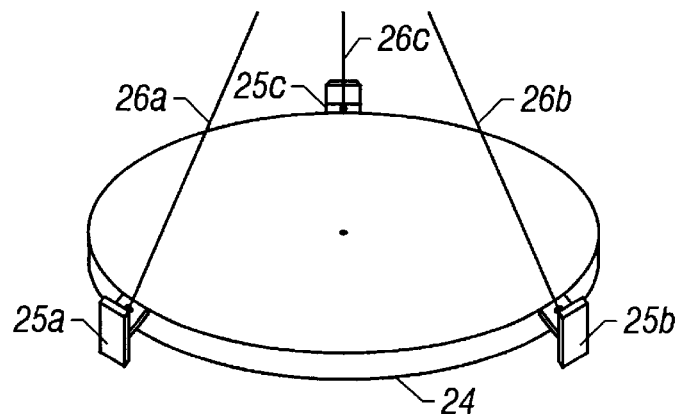
FIG. 9 is perspective view of the portion shown in FIG. 8 illustrating the rods that connect the portion to the valve cover.
Figure 10:
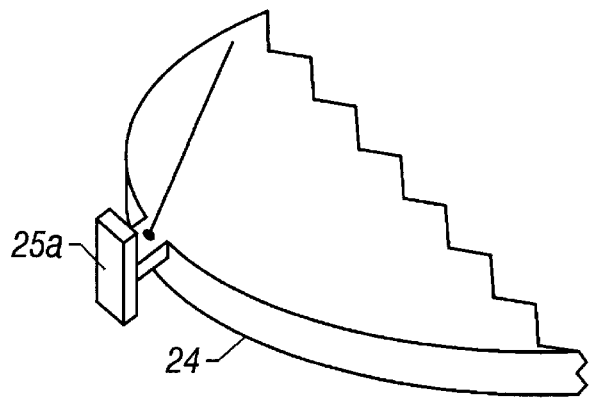
FIG. 10 is enlarged view of a portion of FIG. 9 showing a detail of a tab.

Another embodiment of a locking mechanism for the invention is shown in FIGS. 6, 7, 8 and 9. The only difference between valve cover 1 and valve cover 20 of FIGS. 1 and 6 respectively is the embodiment of the locking mechanism, otherwise valve cover 1 and valve cover 20 are the same. FIGS. 6 and 7 show embedded through the center of valve cover 20 a plug 21. Butyl rubber plug 21 has at its center a watertight elongated slit 22 that is long enough to allow an ordinary screw driver or rod to be inserted and to fully penetrate through valve cover 20 into the valve system. Tabs 25a, 25b, and 25c of portion 24, which is connected to valve cover 20 by rods 26a, 26b, and 26c, engage tube 15 to inhibit the movement and removal of valve cover 20. The locking system utilizes a concave portion 24 shown in FIGS. 7, 8, and 9, that has a diameter slightly smaller than the inside diameter of tube 15. Portion 24 is generally circular and can be made from nonferrous metal, plastic or other elastic material that is capable of retracting radially towards the central axis whenever a downward force is directed at its center. In a preferred embodiment portion 24 has at its center an indentation that is used to impede the movement of rod 23 when it is in contact with portion 24. FIG. 8 shows portion 24 having rectangular tabs 25a, 25b, and 25c located on its outer edge. Tabs 25a, 25b, 25c are spaced approximately 120 degrees apart and scribe a diameter slightly larger than the inside diameter of tube 15. Each tab includes a rigid foot as shown in FIG. 10 necessary to help keep portion 24 perpendicularly aligned with tube 15. Attached to tabs 25a, 25b, and 25c is one end of rigid rod links 26a, 26b, and 26c, respectively. The other ends of rigid rod links 26a, 26b, and 26c are attached to the under side of valve cover 20. FIG. 7 is a sectional view of a portion of the valve system along lines 27—27, shown in FIGS. 6 and 8, and shows tab 25a of portion 24 engaging tube 15 and rigid rod link 26a attached to tab 25a and valve cover 20.

To lock valve cover 20 into valve system 12, place portion 24 on the top of valve cover socket 13. Next, insert a rod 23 into hole 22 of plug 21 and push rod 23 through plug 21 until the end of rod 23 is contacting portion 24 in its central region. A downward force is then exerted on rod 23 to slide portion 24 down into tube 15. As portion 24 slides down into tube 15 rods 26a, 26b and 26c cause valve cover 20 to follow into the valve system until it engages sealing means 1a located on valve cover socket 13. Once the locking mechanism is in place in an untensioned state, tabs 25a, 25b and 25c extend out to engage the wall of tube 15. By engaging tube 15 the locking mechanism inhibits the removal of valve cover 20.

To unlock the locking mechanism and remove valve cover 20, a rod 23 is inserted into hole 22 in plug 21. The rod 23 is pushed through plug 21 until the inserted end of rod 23 is engaging portion 24 in a centrally located region. Exerting a downward force onto the rod 23 will cause portion 24 to temporarily assume a slightly increased rippled conical shape thus allowing the ends of portion 24 to move radially towards the central axis thereby disengaging tabs 25a, 25b and 25c from tube 15. While the tabs are disengaged the dimples 2 are grasped to remove valve cover 20 by lifting it away from valve system 12.

Typically, the valve cover 1 is made from a nonferrous metal which is salt resistant such as marine grade aluminum. Opposite sides are about 5 inches apart. It is desirable to use an electronic marker 6 connected to the bottom of the valve cover 1 to assist in the location of the valve cover 1. Marker 28 shown in FIG. 7 serves the same function as marker 6 but is shifted in position to allow for plug 22. Electronic markers for this purpose are available commercially such as from 3M corporation under the trademark ScotchMark. A hand held electronic device (not shown) can identify the location of the electronic marker 6 when it is out of view and even if it is buried or under water during a flood. The sectional view shown in FIG. 3 shows a 3° taper from the top cross section to the bottom cross section.

Figure 5:
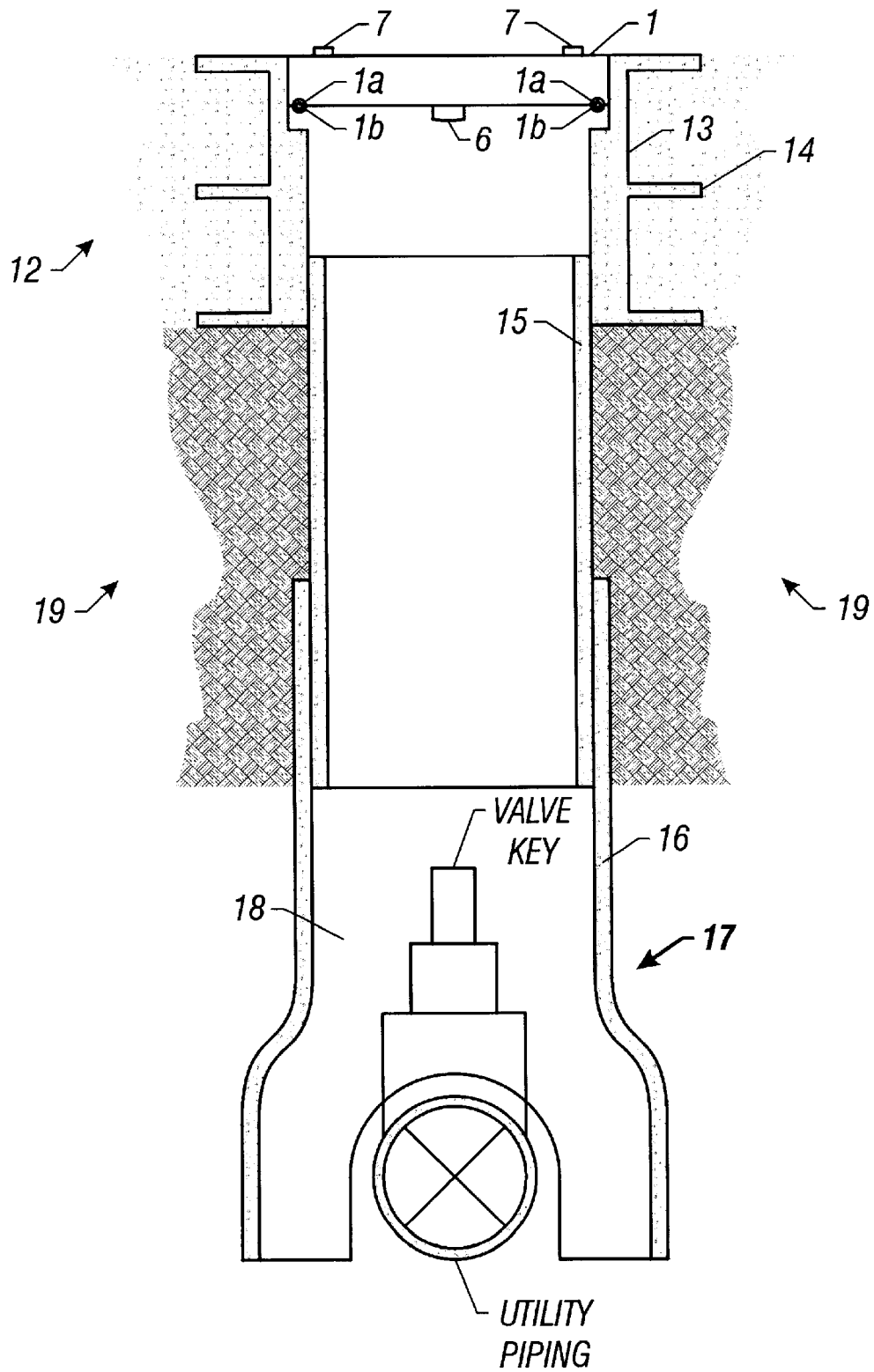
FIG. 5 is a sectional view of the valve cover system according to the invention embedded is the ground.

FIG. 5 shows a sectional view of the valve cover system 12 according to the invention. The valve cover 1 is engaged within a valve cover socket 13 and the blades 9 are positioned to lock the valve cover 1 into its position. The valve cover socket 13 has a plurality of wings or horizontal extension 14 which extend circumferentially around the socket 13 to form bearing surfaces engaging the adjacent ground so that the valve cover 1 will tend to move up and down along with the adjacent ground during cyclical frost heaving and/or other external forces. This tends to cause the valve cover 1 to remain relatively level with the adjacent ground over an extended period of time regardless of local changes in the ground elevation. Typically, pavement is about 3 inches to 6 inches thick so that three horizontal extensions will be satisfactory for substantially all situations.

Preferably, the valve cover 1 engages a sealing means such as a butyl rubber hermetic seal 1a positioned in a groove lb defined in the valve cover socket 13.

The valve cover socket 13 externally engages tube 15 telescopically and is wedged into its position. The tube 15 internally engages a tube 16 telescopically. The tube 16 is a portion of a housing or valve box 17 for a valve 18. The tube 16 allows the length between the housing and the valve cover 1 to be adjusted to accommodate pipe/valve depths.

Spherical polymer based aggregate 19 is positioned around the tube 15 to provide relatively low friction to the tube 15 to allow it to follow ground movements.

It is preferable to use an epoxy based pavement near the valve cover 1 when replacing a prior art valve to compensate for the expected deterioration of the pavement. The epoxy based pavement can fill the annular space between the outside to the valve cover 1 and the edge of the existing pavement encircling the valve cover 1.

There has been described a novel valve cover and system. It is evident that those skilled in the art may now make numerous uses and modifications of and departures from the specific embodiments described herein without departing from the inventive concepts. Consequently, the invention is to be construed as embracing each and every feature and novel combination of features present or possessed by the inventions herein disclosed and limited solely by the spirit and scope of the appended claims.

What is claimed is:

1. In a valve cover system a valve and a valve cover, and being suitable for being in a distribution network for communicating a fluid such as water or fuel gas through a plurality of additional valve systems, the improvement comprising said valve cover having a shape generally in the form of a regular octagon; a valve box for being buried in the ground, a valve socket externally engaged to a hollow cylindrical tube telescopically, said tube internally engaged telescopically at one end to said valve box and allowing access to the interior of said valve box, and engaged at the other end to said valve socket; sealing means operable for producing a substantially hermetic seal between said valve cover and said valve socket to inhibit the movement of any external liquids into said tube; said valve cover having indicia defined thereon to indicate essential information relating to both said valve and relative fluid passing through said valve and other valve systems in said network; said valve socket further including extensions forming bearing surfaces engaging the adjacent ground so that said valve socket will tend to move up and down along with the adjacent ground engaged by said extensions, whereby said valve cover will tend to remain relatively level with the adjacent ground over an extended period of time regardless of local changes and shifts on the ground elevation; said valve box being composed of a nonferrous material selected to resist corrosion; and to avoid explosion inducing sparks, and said valve system further comprising spherical polymer based aggregate surrounding said tube and generally between said tube and the adjacent ground, thereby reducing the inhibiting effect of the adjacent ground to movement of said tube relative said valve box, whereby the tendency of adverse conditions such as frost does not cause said valve cover to become below the adjacent ground due to said tube being inhibited relative said valve box.

2. The valve cover system of claim 1, wherein said sealing means comprises a butyl rubber "O" ring between the surfaces of said valve cover and said valve socket.

3. The valve cover system of claim 1, wherein both said valve box and said valve socket slidably engage said tube.

4. The valve cover system of claim 1, wherein said tube allows selective access to the interior of said valve box.

5. The valve cover system of claim 1, further comprising a passive electronic system connected to said cover and operable to be interrogated by an active signal transmitter so that the location of said valve cover can be made electronically.

6. The valve cover system of claim 1, wherein said valve cover system is embedded in asphalt pavement, further comprising of an epoxy based pavement replacement material to overcome the problems of deterioration of asphalt pavement replacement when said valve cover is used to replace a prior art valve cover system, said epoxy based pavement being positioned to fill the annular space between the outside of said valve cover and the edge of the existing pavement encircling said valve cover.

7. The valve cover system of claim 1, further comprising a locking means operable for inhibiting the movement of said valve cover thereby discouraging unauthorized access and vandalism.

8. The valve cover system of claim 7, wherein said locking means comprises an elongated hole in the general center of said valve cover dimensioned to allow for penetration of said valve cover by a rod from the top side through to the underside of said valve cover into said valve system; a concave portion that is made from material that is capable of retracting radially towards the central axis whenever a downward force is directed at its center and includes at least three protruding tabs for engaging said tube when said portion is in an non-tensioned state, said portion being connected to said valve cover by at least three connecting rods, each of said connecting rods being attached to each of said tabs on one end and to said valve cover on the other end respectively; whereby said valve cover is locked into said valve system by inserting said rod into said hole until said rod engages said portion, inserting said portion into said valve socket, applying a downward force on said rod sufficient to move said portion into said tube until said valve cover engages said valve socket.

* * * * *